United States Patent [19]

Yasue

[11] Patent Number: 4,594,709
[45] Date of Patent: Jun. 10, 1986

[54] DATA TRANSMISSION DEVICE FOR LOOP TRANSMISSION SYSTEM

[75] Inventor: Kazuo Yasue, Tokyo, Japan

[73] Assignee: NEC Corporation, Japan

[21] Appl. No.: 526,305

[22] Filed: Aug. 25, 1983

[30] Foreign Application Priority Data

| Aug. 25, 1982 | [JP] | Japan | 57-147203 |
| Aug. 27, 1982 | [JP] | Japan | 57-148983 |
| May 31, 1983 | [JP] | Japan | 58-95951 |
| May 31, 1983 | [JP] | Japan | 58-95952 |

[51] Int. Cl.⁴ .................................................. G06F 11/00
[52] U.S. Cl. .......................................... 371/8; 370/16; 371/11
[58] Field of Search .................... 364/200, 900; 371/8, 371/16, 11; 370/16; 340/825.01; 179/175.35

[56] References Cited

U.S. PATENT DOCUMENTS

| 4,009,469 | 2/1977 | Boudreau et al. | 371/8 |
| 4,159,470 | 6/1979 | Strojny et al. | 371/8 |
| 4,186,380 | 1/1980 | Edwin et al. | 371/8 |
| 4,354,267 | 10/1982 | Mori et al. | 371/11 |
| 4,365,248 | 12/1982 | Bargeton et al. | 340/825.01 |
| 4,442,518 | 4/1984 | Morimoto | 371/8 |
| 4,506,357 | 3/1985 | Nakayashiki | 370/16 |

*Primary Examiner*—Michael R. Fleming
*Attorney, Agent, or Firm*—Sughrue, Mion, Zinn, Macpeak, and Seas

[57] ABSTRACT

A loop transmission system is disclosed which, on the failure of a transmission path in an active loop or transmission paths in both active and back up loops between adjacent transmission devices, automatically switches all the transmission devices from one of the loops to the other, without observing any particular transmission device, so that the whole system is capable of reconstructing a new loop. A faulty portion is located and a loop back configuration is set up excluding the faulty portion.

12 Claims, 20 Drawing Figures

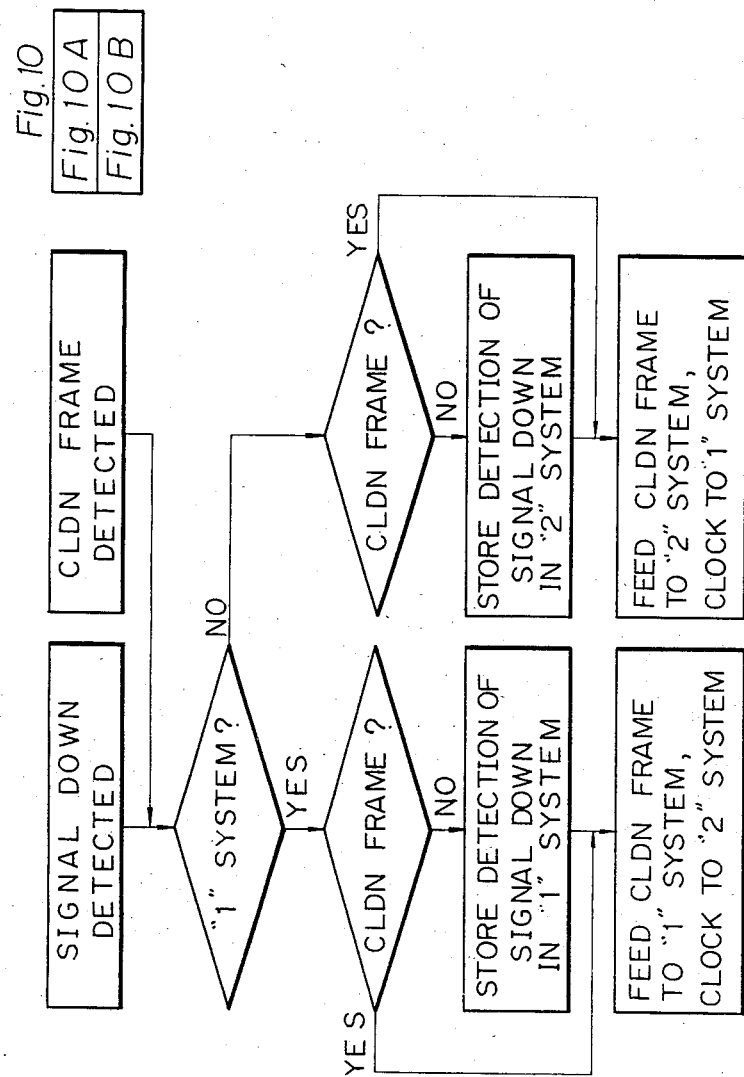

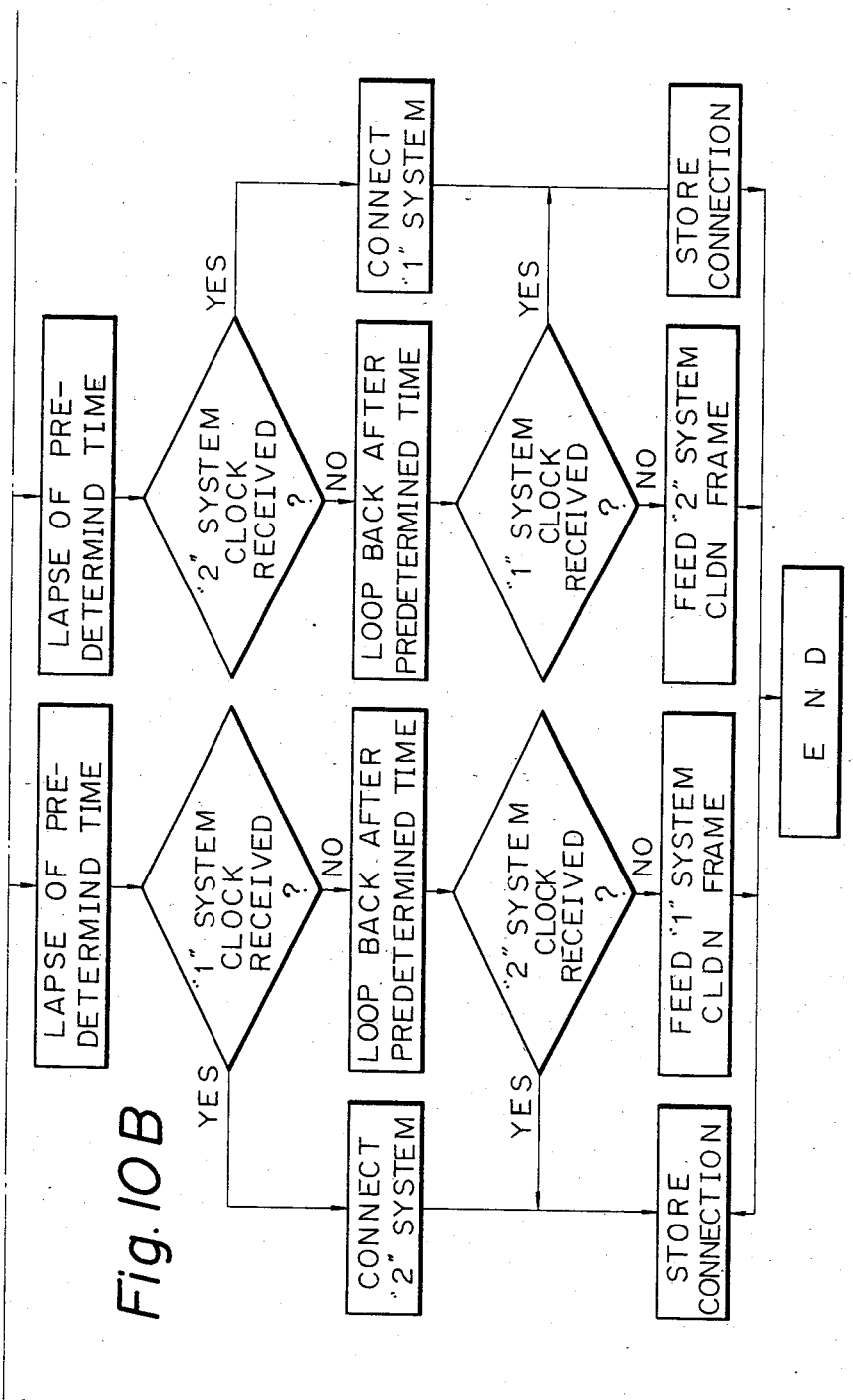

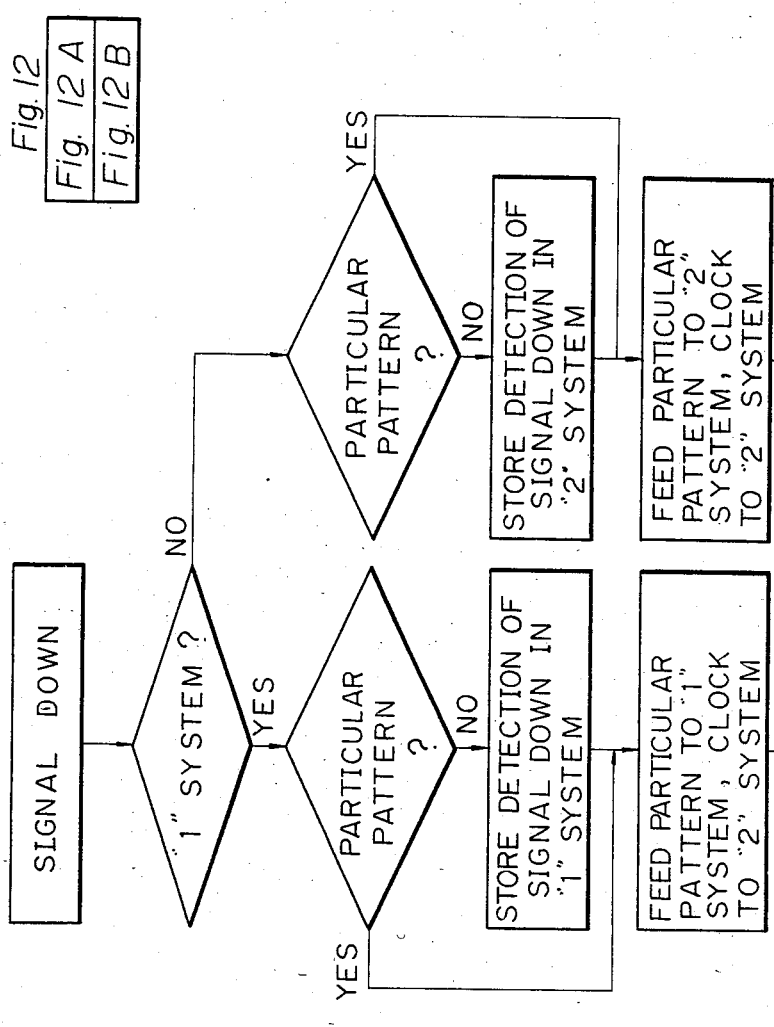

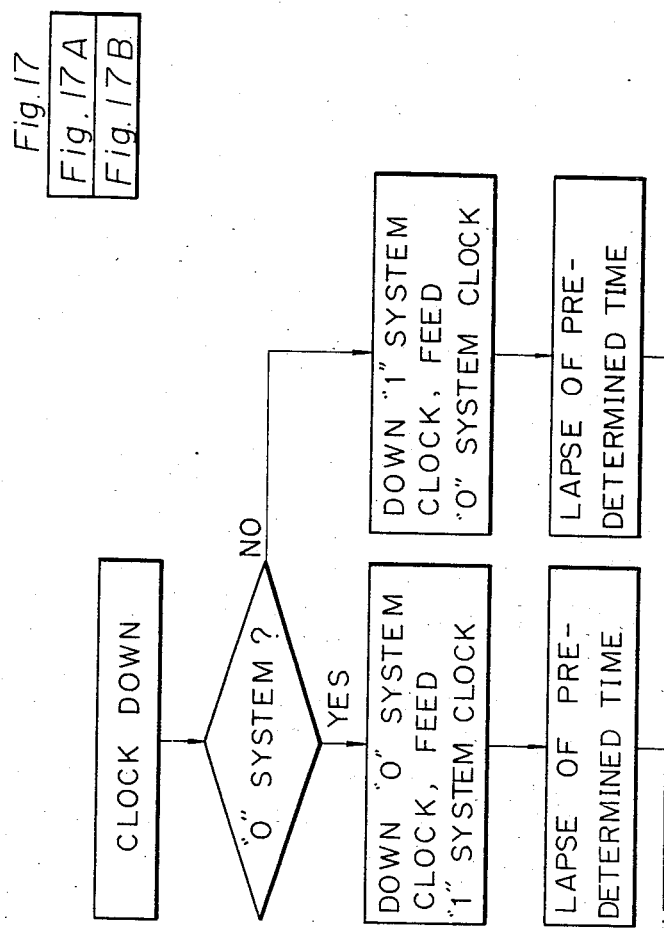

DATA TRANSMISSION DEVICE FOR LOOP TRANSMISSION SYSTEM

BACKGROUND OF THE INVENTION

The present invention relates to a data transmission device for a loop transmission system which is applicable to a local area network or the like.

A loop transmission system employs two independent loops which allow signals to flow therethrough in opposite directions to each other, taking into account possible failures in the transmission paths. Generally, when a failure occurs in one of the loops which is in operation, it is switched to the other loop to continue communications.

One approach to the recovery from a failure in a loop is disclosed in "32 Mb/s Optical Fiber Loop Network: H-8644", HITACHI REVIEW, Vol. 31, No. 3, June 1982, pages 125-130. In the system disclosed, when a loop service node (LSN), or master station, detects a loop timing failure, it interrupts the delivery of loop timing which is occurring in the transmission paths of an active loop and, while feeding out a particular pattern to the transmission paths of the other or back up loop, switches the loop from the active to the back up. Meanwhile, all the field service noded (FSN), or slave stations, check a signal in the back up loop and switch the loop when they have found a loop timing failure in the active loop. When both the loops have failed, the LSN sends out a command for sequentially looping back remote FSNs to thereby cause the FSNs into loop back operation and, awaiting a return of the loop timing, locates a failure portion to set up a loop back path which excludes the failure portion.

This type of prior art system has the drawback that once the LSN or master station causes a failure therein, the whole system becomes down making the loop unable to be reconstructed. Another drawback is that the LSN has to memorize various factors related to the FSNs such as the number and sequence. Additionally, an intricate procedure is required for coping with the loop back condition.

SUMMARY OF THE INVENTION

The present invention comprises a transmission system for carrying information in a frame format and having a transmission path comprising two parallel transmission loops, each adapted to propagate signals in a direction opposite to the other and connecting each of several identical transmission devices in order to maximize the continuity of the system communications in the event that a failure occurs in one or both of the transmission loops. One loop is considered the "active" loop and the second loop is considered the "back up" loop. Each transmission device is capable of detecting a failure in the active transmission loop at its input and signalling from its output to a downstream transmission device the occurrence of such failure. Each transmission device also is responsive to the failure signal from an upstream device to relay the signal to a downstream device.

In a first embodiment of the invention, upon detection by a transmission device of an upstream failure, it supplies the active loop with a clock "down" signal and the back up loop with a second signal for transmission downstream by the device. After predetermined period of time the transmission is switched from the active to back up loop if the back up loop is intact as determined by reception of the second signal by the device and a loop back condition is set up if the back up loop is broken.

Any or all devices may be made capable of monitoring the continuity of the transmission path and can poll the other transmission devices in order to identify a failure situation.

In a second embodiment of the invention, in response to a clock "down" signal, a transmission device generates a unique pattern that is transmitted in the active loop and switches the input and output of all subsequent devices to the back up loop, while storing detection of that condition.

In a third embodiment of the invention, the transmission devices have no storage capability and all of the transmission devices are automatically and sequentially switched from an active loop to a back up loop as soon as a failure occurs in the active loop.

In a fourth embodiment of the invention, a transmission failure generates a signal which inactivates the active loop but not the back up loop and, on expiration of the period of time, sets up a loop back condition in the back up loop.

It is therefore an object of the present invention to provide a data transmission system which eliminates the drawbacks discussed above and, on the failure of a transmission path in an active loop or transmission paths in both active and back up loops between adjacent transmission devices, automatically switches all the transmission devices from one of the loops to the other, without paying attention to any particular transmission device.

It is another object of the present invention to provide a data transmission system which, in response to failures in both active and back up loops between adjacent transmission devices, automatically constructs a turn loop with faulty portions excluded (loop back).

It is another object of the present invention to provide a data transmission system which is capable of locating a failure portion in a loop.

It is another object of the present invention to furnish all the transmission devices with identical functions.

It is another object of the present invention to provide a generally improved data transmission device for a loop transmission system.

The above and other objects, features and advantages of the present invention will become apparent from the following detailed description taken with the accompanying drawings.

BRIEF DESCRIPTION OF THE DRAWINGS

FIG. 10 illustrates the combination of FIG. 10A and FIG. 10B into a flowchart demonstrating the operation of the first embodiment of the present invention FIG. 10A showing the initial activity upon detection of a failure and FIG. 10B showing the concluding activity as the corrective action takes place.

DESCRIPTION OF THE PREFERRED EMBODIMENTS

While the data transmission device for a loop transmission system of the present invention is susceptible of numerous physical embodiments, depending upon the environment and requirements of use, substantial numbers of the herein shown and described embodiments have been made, tested and used, and all have performed in an eminently satisfactory manner.

Figure 1:
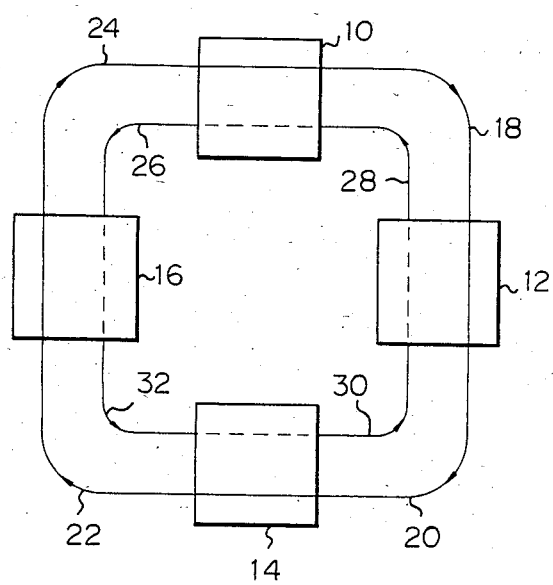
FIG. 1 is a diagram of a loop transmission system to which the present invention is applicable.

Referring to FIG. 1 of the drawings, a loop transmission system to which the present invention is applicable is shown and comprises transmission devices 10, 12, 14 and 16, a first transmission loop made up of paths 18, 20, 22 and 24, and a second transmission loop made up of paths 26, 28, 30 and 32. During a normal system operation, the first loop is used for data communication while the second loop is bypassed.

Figure 2:
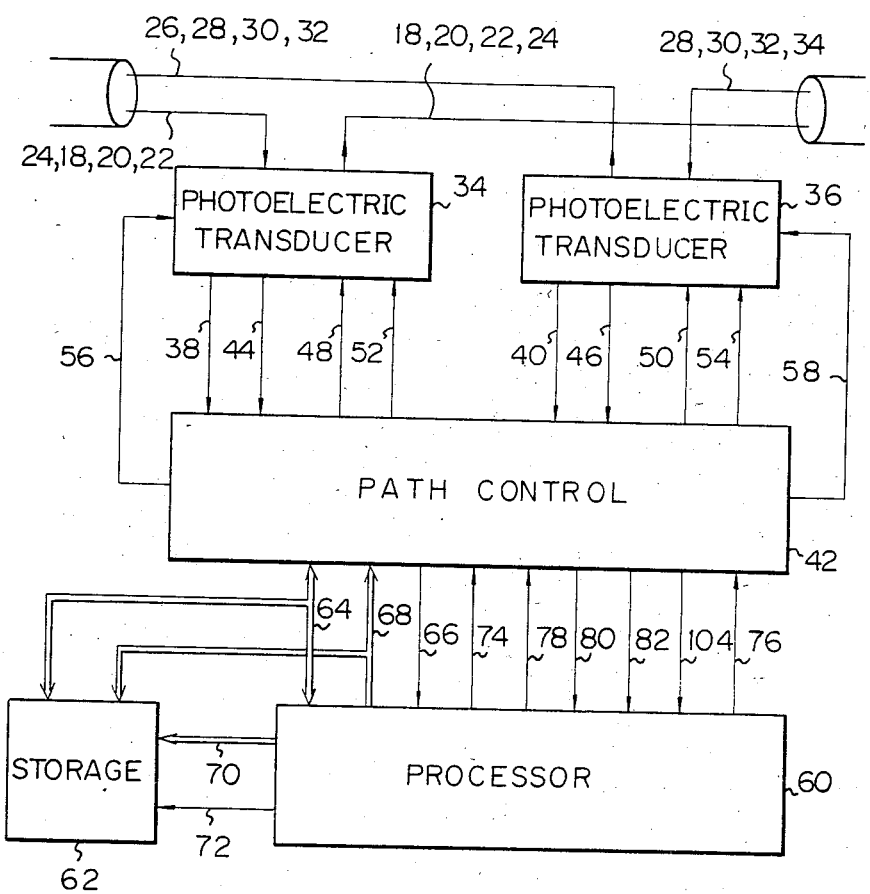
FIG. 2 is a block diagram of a data transmission device embodying the present invention.

Referring to FIG. 2, a transmission device embodying the present invention and adapted for use in an optical fiber communication system is shown. The device includes a first photoelectric transducer circuit 34 and a second photoelectric transducer circuit 36. Clock lines 38 and 40 respectively extend from the photoelectric transducers 34 and 36 to a path control circuit 42, to supply it with clock pulses provided by photoelectric conversion. Also extending from the photoelectric transducers 34 and 36 to the path control circuit 42 are data lines 44 and 46 for the delivery of data. Clock lines 48 and 50 respectively extend from the path control 42 to the first and second photoelectric transducers 34 and 36 in order to supply clock pulses which will be fed out to the transmission paths 18 and 26. Further, data lines 52 and 54 extend from the path control 42 to the photoelectric transducers 34 and 36 to supply data which will be fed out to the transmission paths 18 and 20. The path control 42 controls the photoelectric transducers 34 and 36 independently of each other by supplying control signals over control lines 56 and 58. The device also includes a processor 60 for microprogram control and a storage 62 which are interconnected to each other and to the path control 42 by a data bus 64. An interrupt line 66 extends from the path control 42 to the processor 60. A group of lines 68 extend from the processor 60 to the path control 42 and storage 62 in order to control them. An address line 70 extends from the processor 60 to the storage 62. A write pulse line 72 also extends from the processor 60 to the storage 62 for writing data thereinto, while a write pulse line 74 extends from the processor 60 to the path control 42 for writing data thereinto. A reset line 76 for delivering a master reset signal extends from the processor 60 to the path control 42. A request line 78 extends from the processor 60 to the path control 42 to supply it with a transmission signal which appears when data is fed to the path 18 or 26. A line 80 is adapted to supply an interrupt signal from the path control 42 to the processor 60 when the path control 42 has detected a specific frame. Further, a line 82 allows the path control 42 to supply the processor 60 with an interrupt signal in response to entry of a frame into a receive buffer (not shown).

Figure 3:
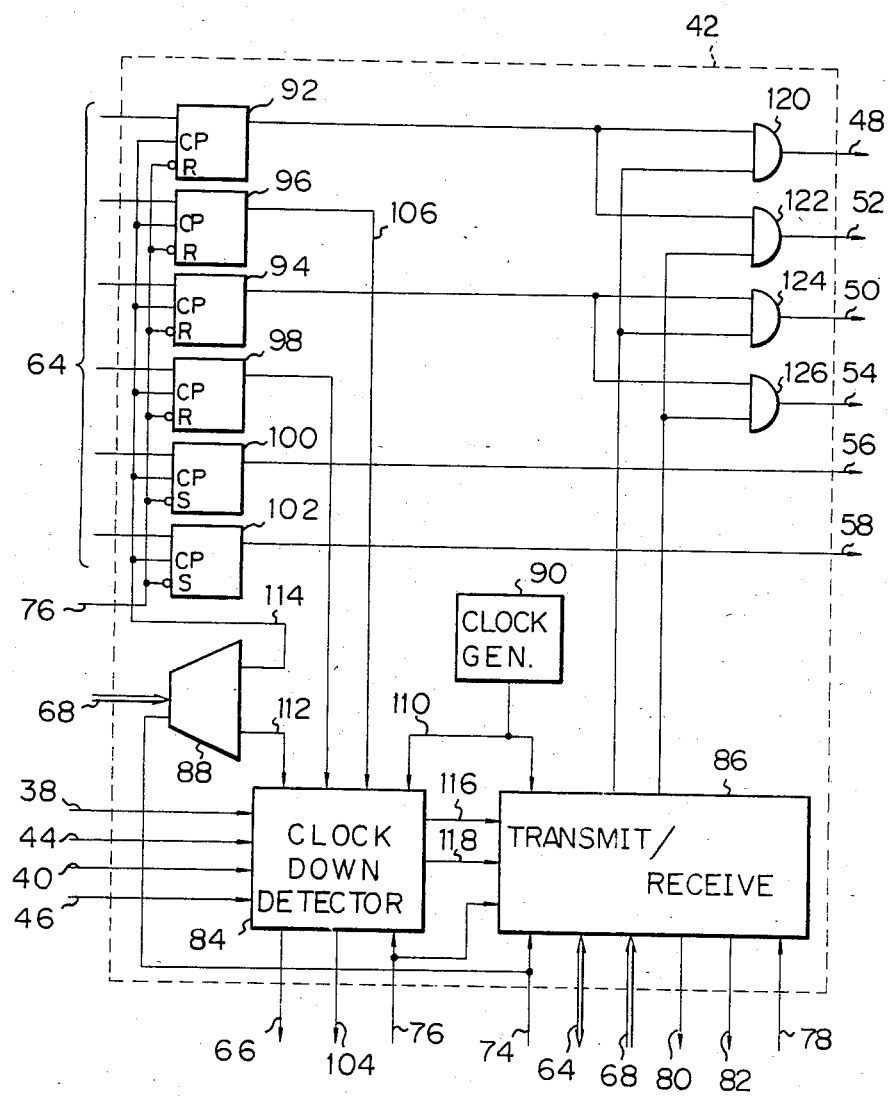
FIG. 3 is a block diagram showing an example of a path control circuit included in the device of FIG. 2.

Details of the path control 42 are shown in FIG. 3. As shown, the path control 42 includes a clock down detector circuit 84, a transmit/receive circuit 86 for controlling data supply to and from the loops, a decoder 88, and a clock generator circuit 90. Various flip-flops are included in the path control: a flip-flop 92 for showing that transmission to the first loop is enabled, a flip-flop 94 for showing that transmission to the second loop is enabled, a flip-flop 96 for showing that receipt from the first loop is enabled, a flip-flop 98 for showing that receipt from the second loop is enabled, a flip-flop 100 for delivering a bypass command to the first loop, and a flip-flop 102 for delivering a bypass command to the second loop. A line 104 is adapted to deliver a clock detection signal indicative of detection of a signal which does not become down. An output line 106 extends from the flip-flop 96, and an output line 108 from the flip-flop 98. A clock line 110 connects the clock generator 90 to the clock down detector 84 and transmit/receive circuit 86 to supply the latter with internal clock generated by the former. The output of the decoder 88 is coupled to the clock down detector 84 by a line 112 and to the flip-flops 92–102 by a line 114. A serial data line 116 and a received clock line 118 connect the clock down detector 84 to the transmit/receive circuit 86. Also included in the circuitry are AND gates 120, 122, 124 and 126.

Figure 4:
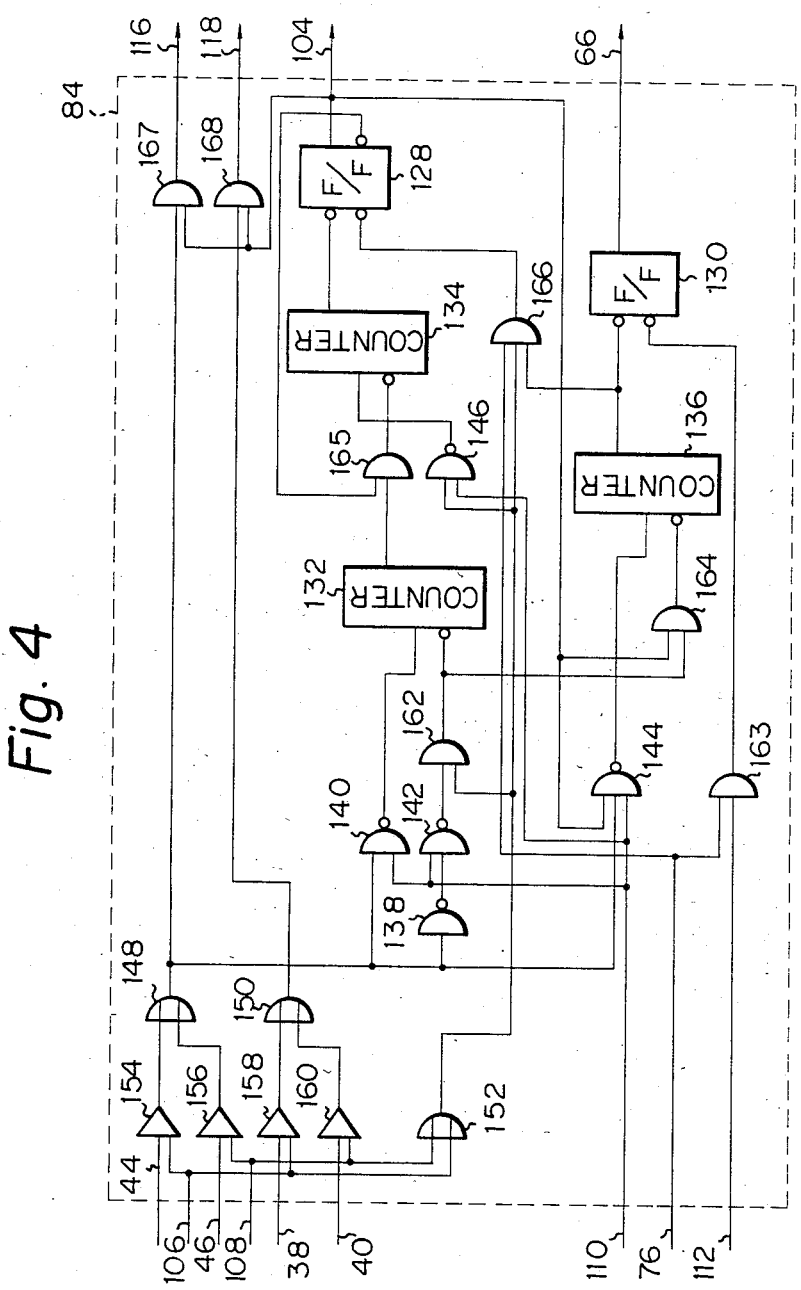
FIG. 4 is a diagram showing an example of a clock down detector circuit also included in the device of FIG. 3.

The clock down detector 84 of FIG. 3 is constructed in the manner shown in FIG. 4. In the drawing, a flip-flop 128 is adapted to show that the loop is in connection with the transmission device, while a flip-flop 130 is adapted to show that the clock signal is down indicating a transition from connection to disconnection. A counter 132 determines whether or not logical ONEs sequentially appear in input data from the loop until a predetermined value $T_0$ is reached. A counter 134 continues to operate until a predetermined value $T_1$ is reached, unless the counter 132 reaches the value $T_0$ while the receipt enable flip-flop 96 or 98 is being turned on. A counter 136 keeps on operating up to a predetermined value $T_2$ unless a ZERO is detected in input data from a loop while the flip-flop 128 is being turned on. The clock line 110 supplies the internal clock and the reset line 76 supplies the master reset signal, as previously described. The line 112 supplies the reset signal for resetting the clock down flip-flop 130 which is output from a higher stage device. Also included in the clock down detector 84 are NAND gates 138, 140, 142, 144 and 146, OR gates 148, 150 and 152, receivers 154, 156, 158 and 160, and AND gates 162, 163, 164, 165, 166, 167 and 168.

Figure 7:
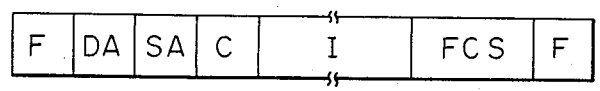
FIG. 7 is a view of a general configuration of a frame applicable to the present invention.

As shown in FIG. 7, a frame applicable to the present invention comprises a flag pattern F, "01111110", a destination address DA, a source address SA, control data C, information I to be transmitted, and cyclic redundancy check bits FCS adapted to determine whether a frame has been properly transferred by the frame check sequence. The information I may be absent in the frame format.

Figure 8:
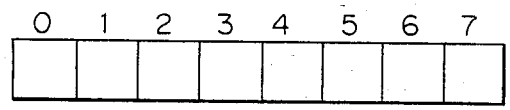
FIG. 8 is a view of a format of status bits applicable to the present invention and adapted for indication of various connection conditions of the transmission device as well as failure information.

Shown in FIG. 8 is a status information format which will be stored in the storage 62. In the format, the bit "0" represents connection to the first loop, bit "1" connection to the second loop, bit "2" connection in a loop back mode A (meaning, in this particular embodiment, that the receive side is connected to the first loop and the transmit side to the second), bit "3" connection in a loop back mode B (meaning, in this particular embodiment, that the receive side is connected to the second loop and the transmit side to the first), bit "4" detection of a signal down in the first loop, and bit "5" a signal down in the second loop.

In operation, the first loop or paths 18, 20, 22 and 24 are used for communications under normal conditions. In the transmission device 10, there are set the transmission enable flip-flop 92 associated with the first loop, receipt enable flip-flop 96 associated with the first loop, and by-pass flip-flop 102 associated with the second loop. The signal on the output line 104 from the clock down detector 84 is turned on. The other transmission devices 12, 14 and 16 are in the same condition as the device 10 and individually connected to the first loop.

Referring to FIGS. 2, 3, 5 and 7 when breakage occurs in the path 24 of the first loop in the above situation, the photoelectric transducer 34 of the device 10 in the first loop makes the data line 44 all-ONE. In response to the signal thus appearing on the data line 44, the clock down detector 84 delivers an interrupt signal over the line 66 to the processor 60 so that the processor 60, reading the status stored in the storage 62, knows that the device has been connected to the first loop. As a result, the processor 60 sets data in the bit "4" of the status format indicating that the first loop has failed. The processor writes DA, SA and C into a transmit buffer of the transmit/receive circuit 86 in this order, via the line group 68, data bus 64 and write pulse line 74. In this instance, C is the control data indicative of the clock down in the loop (the frame appearing at this instant will be referred to as CLDN frame hereinafter).

The processor 60 turns on the transmission request line 78 to activate the transmit/receive circuit 86 shown in FIG. 3. Then, the circuit 86 transforms the input parallel data into serial data to feed them out to the data line 52 in the order of F, DA, SA, C, FCS and F. The electrical signal fed over the data line 52 is converted by the photoelectric transducer 34 into light which is then fed out to the first loop. The F and FCS in this condition are automatically generated by the transmit/receive circuit 86. Further, the processor 60 supplies the transmission control 42 with data via the data bus 64 and write pulse via the write pulse line 74. In response to the data and write pulse, the transmission enable flip-flop 92 and receipt enable flip-flop 96 associated with the first loop are individually turned off intercepting the flow of the clock and data to the first loop (clock down condition in this embodiment). Simultaneously, the transmission enable flip-flop 94 and bypass flip-flop 102 associated with the second loop are turned on and off, respectively. At this time, the transmission request line 78 is off so that the transmit/receive circuit 86 continuously feeds out to the loop a pattern which does not make the clock signal down (one whose signal is effective). As a predetermined time expires, the receipt enable flip-flop 98 associated with the second loop is turned on whereby the processor 60 detects a signal on the clock detecting signal line 104, which is an output of the clock down detector 84.

Meanwhile, the data transmission device 12 receives the CLDN frame coming in through the loop 18 and delivers it to its transmit/receive circuit 86 via the photoelectric transducer 34 of FIG. 2 and the clock down detector 84 of FIG. 3. While eliminating the CLDN frame, that is, preventing it from advancing farther, the transmit/receive circuit 86 turns on the interrupt signal on the signal line 80 informing the processor 60 of the receipt of the CLDN frame. The processor 60 seeing the receipt of the CLDN frame, determines that a clock down has occurred in the loop. The processor 60 in the device 12 operates just as the device 10 operated in response to a clock down, except for not setting the bit "4" of the status format (the bit "4" is not set when the CLDN frame is received by the device 12).

In the above situation, the pattern which does not cause a clock down is flowing through the transmission path 28. Therefore, when the processor 60 of the device 10 checks the signal output from the clock detection line 104, it has been turned on to turn on the bypass flip-flop 100 associated with the first loop. This is followed by switching the device 10 from the first loop to the second, resetting the bit "0" of the status format and setting the bit "1" instead. As a result, a status representing the connection to the second loop is stored in the storage 62. The CLDN frame propagates in this manner as far as the transmission device 16, thereby switching all the devices into connection with the second loop.

Figure 5:
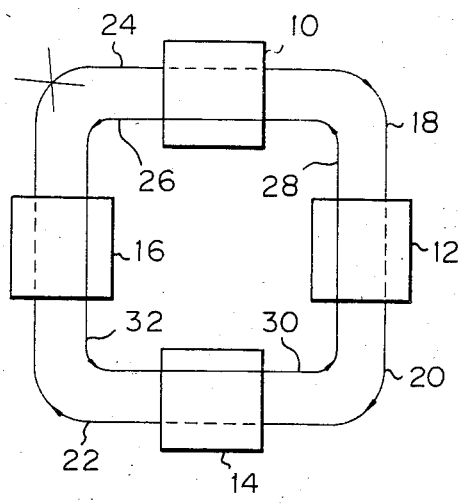
FIGS. 5 and 6 are diagrams of a loop transmission system in different conditions set up in accordance with the present invention.

FIG. 5 illustrates the final system condition entailed by a breakage in the transmission path 24. Because the bit "4" of the status format has been set in the transmission device 10, a failure in the path 24 is uniquely identified within the whole system is considered. Assuming that the transmission device 14 is monitoring the loops, it is possible to know any failure in the transmission paths and devices in the whole system by defining a command frame, which is adapted to read status information in the respective devices at predetermined intervals, in accordance with the format shown in FIG. 7 (the so defined command frame will be referred to as RSTS frame hereinafter). On the receipt of the RSTS frame, each device routes it through the clock down detector 84 to the receive buffer of the transmit/receive circuit 86. Then, an interrupt signal is fed to the processor 60 over the line 82 to inform it of the entry of the RSTS frame. The processor 60, therefore, is allowed to read the data stored in the receive buffer via the data bus 64 and group 68.

The processor 60, on the detection of a status read request from the device 14, reads the status out of the storage 62 and writes it sequentially into the transmit buffer of the transmit/receive circuit 86 based on the frame configuration of FIG. 8, that is, in the order of a destination address DA, a source address SA, control information C indicative of the presence of status information, and 8-bit status information I. As soon as the signal on the transmission request line 78 is turned on, the whole frame is transformed from the parallel data to the serial and then sent out to the transmission device 14 via the photoelectric transducer 34 or 36. When the frame enters the receive buffer of the transmit/receive circuit 86 in the device 14, an interrupt signal is fed from the path control 42 to the processor 60 over the line 82. The processor 60 is now allowed to read the data stored in the receive buffer via the data bus 64 and group 68, thus seeing the return of an answer frame to the RSTS frame from each transmission device. Reading out the status, the processor 60 identifies the failure in the transmission path and each transmission device.

To locate a failure in the transmission paths and transmission devices in the whole system, on the lapse of a predetermined period of time after the detection of a clock down by each transmission device (a period of time accommodating disturbance to the transmission paths due to loop switching), its processor 60 reads a status out of the storage 62 and sends it out to the monitoring device 14 based on the frame of FIG. 8. The procedure which each device undergoes for reading a status out of the storage 62 and sending it to the monitoring device 14 is the same as the previously discussed procedure. While the frame has been described as being fed to the device 14 only, it may be supplied to all the devices if desired.

Now, assume that both the associated transmission paths 24 and 26 have failed. Then, in the operation of the final transmission device 16 described in conjunction with the failure in the path 24, the signal on the clock detection line 104 has been turned off when checked by the processor 60 due to the failure in the path 26. This turns off the receipt enable flip-flop 98 associated with the second loop while turning on the receipt enable flip-flop 96 associated with the first loop. However, because each of the transmission devices 10, 12 and 14 associated with the first loop is in the bypass condition setting up the clock down condition, the signal on the clock detection line 104 in the device 16 remains turned off. Hence, the processor 60 writes DA, SA and C sequentially into the transmit buffer of the transmit/receipt circuit 86 via the group 68, data bus 64 and write pulse line 74, in order to prepare the CLDN frame.

Further, the processor 60 turns on the signal on the transmission request line 78 to activate the transmit/receipt circuit 86 of FIG. 3, which then feeds out the frame to the data line 52 in the order of F, DA, SA, C, FCS and F. The photoelectric transducer 36 (FIG. 2) transforms the incoming frame into an optical signal to send it out to the second loop. After turning off the transmission enable flip-flop 94 for a given time, the processor 60 turns it on, resets the bit "0" of the status format, sets the bit "2", and stores the resulting status information in the storage 62. That is, the device 16 is brought into the loop back condition using the first loop for receipt and the second loop for transmission, thereby developing a clock down in the path 32 for a predetermined time. The processor 60 in the device 14 responds to the clock down by detecting the "on" state of the interrupt line 80, feeding the CLDN frame to the second loop, turning off the transmit enable flip-flop 94 and receipt enable flip-flop 98 associated with the second loop by the data on the data bus 64 and write pulse on the write pulse line 74, and thereby interrupting the supply of the clock and data to the second loop.

Afterwards, the processor 60 turns on the transmit enable flip-flop 92 associated with the first loop while turning off the bypass flip-flop 100. The transmit/receive circuit 86 continuously sends out to the line a pattern which does not cause clock down, because the transmission request line 78 has been turned off. On the lapse of a predetermined time, the receipt enable flip-flop 96 associated with the first loop is turned on so that the processor 60 checks a signal on the clock detection line 104, which is an output of the clock down detector 84. However, the device 12 operates in the same manner as the device 14 due to the flow of the CLDN frame through the transmission path 30, the transmission path 20 thus being free from the clock down condition. That is, the clock detection line 104 has been turned on when checked by the processor 60. As a result, the processor 60 turns on the bypass flip-flop 102 associated with the second loop, switches the loop from the second to the first, resets the bit "1" of the status format, sets the bit "0", and stores the resulting status in the storage 62.

In the manner described, the CLDN frame sequentially propagates through the second loop down to the device 10 in order to replace the second loop by the first. Due to the failure in the path 24, the clock detection line 104 has been turned off when the processor 60 of the device 10 checks it. Therefore, the receipt enable flip-flop 96 for the first loop is turned off while the receipt enable flip-flop 98 for the second loop is turned on. The operation, therefore, advances to checking the signal on the clock detection line 104.

Figure 6:
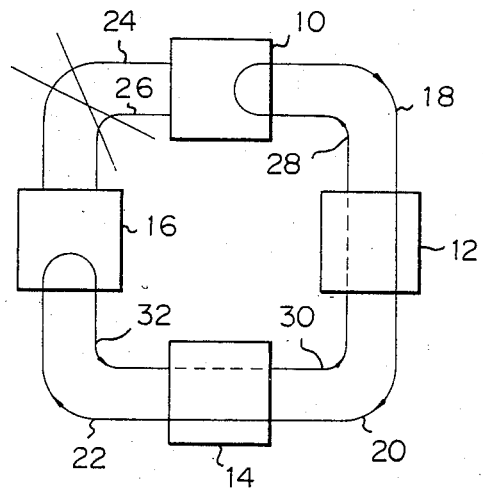

In the above situation, the devices 12 and 14 are individually connected to the first loop while bypassing the second, and the device 16 is in the loop back configuration. Hence, the pattern appearing at the first loop side of the device 10 and which does not cause a clock down, continuously circulates through the devices 12, 14 and 16 and back to the device 10. This maintains the clock detection line 104 of the device 10 turned on and thereby causes the processor 60 of the device 10 to reset the bit "1" of the status format and set the bit "3" instead. The resulting status is stored in the storage 62. This brings the device 10 into the loop back operation in which the second loop is for receipt and the first loop for transmission. It follows that the faulty portion can be located by seeing each status information by the same procedure which has been described in conjunction with the failure in the path 24. The final system condition entailed by the failures in the paths 24 and 26 is shown in FIG. 6.

The operation of the clock down detector 84 will be described in detail. When the receipt enable flip-flop 96 is set, the signal on the line 106 is turned on and the counter 132 is activated in response to input data and input clock fed thereto from the photoelectric transducer 34 via the lines 44 and 38, receiver 154 and NAND gates 138, 140 and 142. The counter 132 is incremented by each ONE in the input data from the photoelectric transducer 34, reset by a ZERO, and caused to generate a pulse in response to the value $T_0$.

While the counter 134 starts its operation due to the "on" state of the receipt enable line 106, it becomes reset either when the counter 132 reaches $T_0$ or when the flip-flop 128 is set. The counter 134 generates a pulse when incremented to $T_1$. Further, the flip-flop 128 is reset in response to the count $T_1$ of the counter 134.

Therefore, as soon as the clock detection line 104 connected to the output of the flip-flop 128 is turned on, the processor 60 is notified of the connection condition of the transmission paths.

If the input data is a ONE when the flip-flop 128 is set and the internal clock is supplied, the counter 136 counts it up. The counter 136 is reset in response to a ONE in the input data. The clock down flip-flop 130 will soon be set in response to a count $T_2$ of the counter 136, that is, the flip-flop 130 concludes a clock down to have occurred due to the continuation of the all-ONE pattern for the time $T_2X$ (period of the internal clock). This sets the clock down flip-flop 130 to turn on the interrupt signal on the line 66. The processor 60 therefore is notified of the occurrence of a clock down. While the counter 136 has been described as being incremented when the input data is a ONE, the same operation of the counter 136 is attainable even if the photoelectric transducer directly detects a failure and a signal which remains "on" during the failure, if available, is employed as input data.

Figure 9:
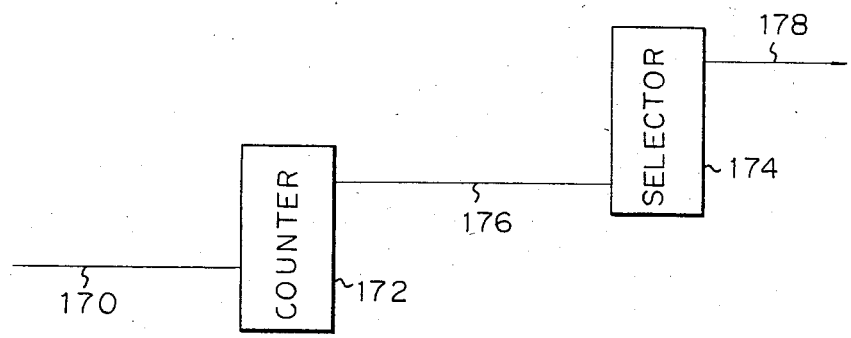
FIG. 9 is a block diagram showing part of a transmit/receive circuit of FIG. 3.

Referring to FIG. 9, a circuitry is shown which confines the number of successive ONEs to within $T_0$ in the pattern which does not cause clock down (one whose signal is effective).

In FIG. 9, the reference numeral 170 designates a clock line for supplying clock signals for transmission. The clock line 170 terminates at a counter 172 which is connected to a selector 174 by a line 176. One bit out of the count of the counter 172 is fed to the selector 174 over the line 176. The output of the selector 174, which is the specific pattern concerned, is delivered by a line 178. The selector 176 is constructed to output a ZERO to the line 178 in response to a ZERO on the line 174, and a ONE in response to a ONE. With this construction, a continuous pattern can be generated repeatedly so long as the clock is constantly supplied to the counter 172 via the clock line 170. Here, the counter 172 is designed to confine the number of ONEs in the pattern, "111 . . . 1", to within $T_0$.

The flowchart shown in FIG. 10 represents the operation of each transmission device discussed hereinabove. The "CLOCK RECEIPT" in the flowchart means that the received signal is effective. The "BY-PASS", on the other hand, implies a situation where, considering the photoelectric transducer 34 for example, an input to the transducer 34 will be output in a loop fashion, neglecting the transmission clock line 48 and data line 52, when the signal on the bypass line 56 is "on". In this particular embodiment, both the receipt clock line 38 and data line 42 are effective in the bypass condition as well.

The "all-ONE pattern" employed to represent clock down may be replaced by an "all-ZERO pattern" or any particular pattern. These alternative patterns are also within the scope of the present invention. Additionally, generation of a particular pattern due to detection of a failure caused by a failure in a photoelectric transducer, generation of a particular pattern due to a failure in a transmission device, and generation of a particular pattern due to a failure, whether intentional or not, in a transmission device connected to the upstream side of a transmission path, result in the procedure described above and, therefore, apply to the embodiment, if they are regarded as failures in the transmission paths.

As described above, in accordance with the first embodiment of the present invention, an active loop is supplied with a frame indicative of a signal down while a back up loop is supplied with a signal which does not indicates a signal down. On the expiration of a predetermined time, the loop is switched from the active to the back up if the signal in the back up loop is effective and a loop back condition is set up if the signal in the back up loop is ineffective. This allows the whole system to automatically reconstruct a new loop while making it possible to automatically locate a failure portion.

Figure 11:
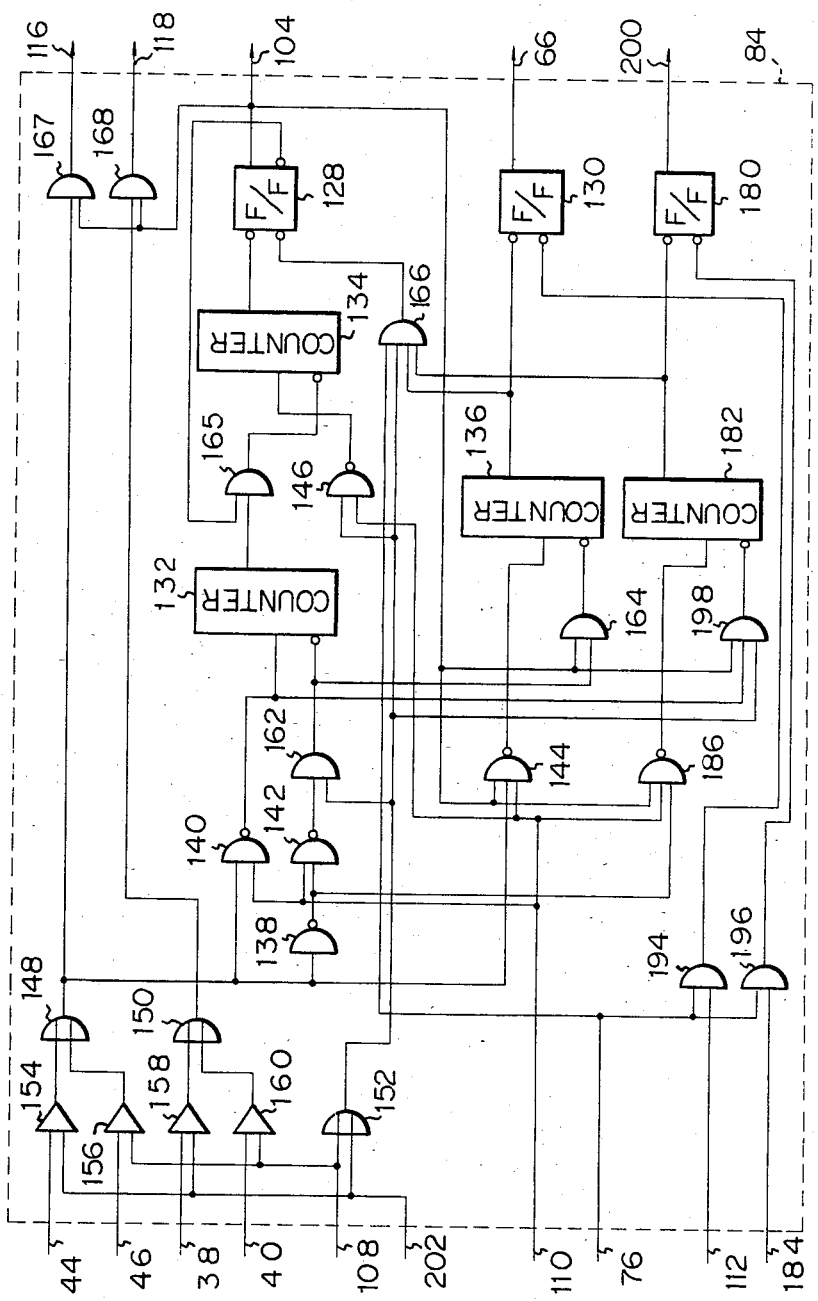
FIG. 11 is a diagram showing another example of the clock down detector circuit of FIG. 3.

Referring to FIG. 11, a second embodiment of the present invention is shown which includes a modified version of the clock down detector circuit 84, which has been described with reference to FIG. 3. The clock down detector in FIG. 11 comprises a flip-flop 180 in addition to the flip-flop 128 which indicates the connection of the transmission paths, and the flip-flop 130 indicating clock down during a transition from connection to disconnection. The counter 132 determines whether ONEs continuously appear in input data to the transmission paths up to the predetermined value $T_0$. The counter 134 is continuously incremented until the predetermined value $T_1$ is reached, unless the counter 132 detects the value $T_0$ while the receipt enable flip-flop 96 or 98 has been turned on. The counter 136 is continuously incremented until the value $T_2$ is reached, unless a ZERO is detected in the input data to the transmission paths while the flip-flop 128 has been turned on. A counter 182 continues its operation up to a predetermined value $T_3$ unless a ONE is detected in the input data while the flip-flop 128 has been turned on. Again, the signal lines include the clock line 110 for delivering the internal clock, reset line 76 for delivering the master reset signal, and signal line 112 over which a higher stage device will deliver a reset signal for resetting the clock down flip-flops 130 and 180. Also included in the circuitry are NAND gates 138, 140, 142, 144, 146 and 186, OR gates 148, 150 and 152, receivers 154, 156, 158 and 160, and AND gates 194, 196 and 198.

The operation of the second embodiment having the above construction will be described in detail. The initial conditions are common to those described in conjunction with the first embodiment. In FIG. 2, when the transmission path 24 in the first loop fails, the photoelectric transducer of the device 10 associated with the first loop makes the data line 42 all-ONE. In response to the signal fed over the data line 42, the clock down detector 84 delivers an interrupt signal to the processor 60 over the line 66. Then, the processor 60 reads the status format (FIG. 8) stored in the storage 62 and thereby sees the connection of the device to the first loop, and sets the status bit "4" in order to show that the first loop has downed. The processor 60 supplies the path control 42 with data via the data bus 64 and write pulse via the write pulse line 74. On the receipt of these data and write pulse, the transmit enable flip-flop 92 and receipt enable flip-flop 96 associated with the first loop are both turned off, so that all-ZERO data is sent out to the first loop (i.e. a pattern different from a pattern related with a path failure is supplied).

Simultaneously, the transmit enable flip-flop 94 associated with the second loop is turned on and the bypass flip-flop 102 turned off. At this instant, because the transmission request line 78 has been turned off, the transmit/receipt circuit 86 continuously delivers to the loop a pattern which does not cause clock down. As a predetermined time expires, the receipt enable flip-flop 98 associated with the second loop is turned on and the processor 60 checks a signal on the clock detection line 104, which is an output of the clock down detector 84.

The all-ZERO pattern now in the transmission path 18 is received by the device 12 to be fed to its transmit/receive circuit 86 via the photoelectric transducer 34 (FIG. 2) and clock down detector 84 (FIG. 3). The circuit 86 responds to a signal coming in through the data line 42, by delivering an interrupt signal to a line 200. The processor 60 sees that clock down has occurred in the transmission paths. The processor 60 in the device 12 operates in exactly the same manner in response to the detection of the clock down by the device 10, except for not setting the bit "4" of the status format (the clock down detection in the device 12 by the all-ZERO pattern does not set the bit "4").

Meanwhile, the pattern which does not entail any clock down is flowing through the transmission path 28. Therefore, the clock detection line 104 in the device 10 has been turned on when the processor 60 checks the signal on the line 104. This turns on the bypass flip-flop 104 associated with the first loop. Thereafter, the loop is switched from the first to the second, and the bit "0" (FIG. 8) is reset while the bit "1" is set. The renewed status indicative of the connection to the second loop is stored in the storage 62. The all-ZERO clock down pattern propagates sequentially through the devices down to the device 16, thereby connecting them to the second loop.

Now, assume that both the associated transmission paths 24 and 26 have failed. Then, in the operation of the final transmission device 16 described in conjunction with the failure in the path 24, the clock detection line 104 has been turned on when checked by the processor 60. This turns off the receipt enable flip-flop 98 associated with the second loop while turning on the receipt enable flip-flop 96 associated with the first loop. However, because the transmission devices 10, 12 and 14 associated with the first loop are in the bypass condition setting up clock down, the clock detection line 104 in the device 16 remains turned off. Hence, the processor 60 turns off the transmission enable flip-flop 94 for a predetermined time and then turns it on again.

Simultaneously, the processor 60 resets the bit "0" (FIG. 8) and sets the bit "2" instead. The resulting status information is stored in the storage 62. That is, the device 16 gains a loop back condition in which the first loop is for receipt and the second loop for transmission, thereby setting up clock down for a given time based on the all-ZERO pattern. Then, the processor 60 in the device 14 detects the "on" state of the clock down interrupt line 80, delivers the all-ZERO pattern to the second loop, turns off the transmission enable flip-flop 94 and receipt permit flip-flop 98 associated with the second loop by the data on the data bus 64 and write pulse on the write pulse line 74, and feeds out the all-ZERO pattern data to the second loop.

Thereafter, the processor 60 in the device 14 turns on the transmission enable flip-flop 92 associated with the first loop while turning off the bypass flip-flop 100. At this instant, the transmission request line 78 has been turned off so that the transmit/receive circuit 86 continuously delivers a pattern which does not cause clock down. On expiration of a predetermined time, the processor 60 turns on the receipt enable flip-flop associated with the first loop and checks a signal on the clock detection line 104, which is an output of the clock down detector 84. However, due to the flow of the all-ZERO pattern through the transmission path 30, the device 12 is operating in the same manner as the device 14 and, therefore, the path 20 is not in clock down. The clock detection line 104, therefore, has been turned on when checked by the processor 60 of the device 14, whereby the bypass flip-flop 102 associated with the second loop is turned on. This switches the loop from the second to the first, resets the bit "1" of the status format, sets the bit "0" instead, and stores the new status in the storage 62.

In this manner, the all-ZERO pattern clock propagates sequentially through the second loop down to the device 10 so as to switch the loop to the first. Concerning the device 10, due to the failure in the path 24, the processor 60 finds the clock detection line 104 to have been turned off when checks it. Therefore, the processor 60 turns off the receipt enable flip-flop 96 associated with the first loop, turns on the receipt enable flip-flop 98 associated with the second loop, and then checks the signal on the clock detection line 104. In the above situation, the devices 12 and 14 are individually connected to the first loop and bypass the second loop, while the device 16 is in the loop back condition. Hence, the pattern appearing at the first loop side of the device 10 and which does not cause clock down, continuously circulates through the devices 12, 14 and 16 and back to the device 10.

As a result, the clock detection line 104 of the device 10 remains turned on so that the processor 60 of the device 10 is caused to reset the status bit "1" and set the status bit "3" instead. The resulting status is stored in the storage 62. This brings the device 10 into the loop back operation in which the second loop is for receipt and the first loop for transmission. It follows that the faulty portion can be located by seeing each status information by the same procedure which has been described in conjunction with the failure in the path 24. The final system condition resulting from the failures in the paths 24 and 26 is shown in FIG. 6.

Details of the clock down detector 84 will be described. When the receipt enable flip-flop 96 is set, a line 202 is turned on to route the data and clock from the photoelectric transducer 34 to the counter 132 via the lines 42 and 38, receivers 154 and 192 and NAND gates 138, 140 and 142, thereby driving the counter 132. The counter 132 is incremented by ONEs in the data from the photoelectric transducer 34, reset by a ZERO, and caused to generate a pulse when incremented to $T_0$.

While the counter 134 is activated due to the "on" state of the receipt enable line 202, it becomes reset either when the counter 132 reaches $T_0$ or when the flip-flop 128 is set. The counter 134 generates a pulse when incremented to $T_1$. Further, the flip-flop 128 is reset in response to the count $T_1$ of the counter 134. Therefore, as soon as the clock detection line 104 connected to the output of the flip-flop 128 is turned on, the processor 60 is notified of the connection condition of the transmission paths. If the input data is a ONE when the flip-flop is set and the internal clock is supplied, the counter 136 counts it up. The counter 136 is reset in response to a ONE in the input data. The clock down flip-flop 130 will soon be set in response to the count $T_2$ of the counter 136, that is, the flip-flop 130 concludes clock down to have occurred due to the continuation of the all-ONE pattern for the time period of $T_2X$ (period of the internal clock). Therefore, the interrupt signal on the line 66 is turned on in response to the setting of the flip-flop 130, thereby informing the processor 60 of the clock down condition.

After the flip-flop 128 has been set, the counter 182 is incremented if the input data is a ZERO. The counter 182 is reset by a ONE in the input data. When no ONEs enter before the counter 182 reaches the value $T_3$, the clock type flip-flop 180 is set. Stated another way, clock down is identified concluding that the all-ZERO pattern has continued for the time period $T_3X$ (period of the internal clock) after setting of the flip-flop 128. As a result, the interrupt signal on the line 200 is turned on in response to setting of the flip-flop 180, notifying the processor 60 of the clock down condition. While the counter 136 has been described as being incremented when the input data is a ONE, the same operation of the counter 136 is attainable even if the photoelectric transducer directly detects a failure and a signal which remains turned on during the failure, if available, is employed as input data.

FIG. 9 shows a circuitry which confines the number of successive ONEs to within $T_0$ in the pattern which does not cause clock down (one whose signal is effective). The construction and operation of this circuitry have been previously discussed.

Figure 12B:
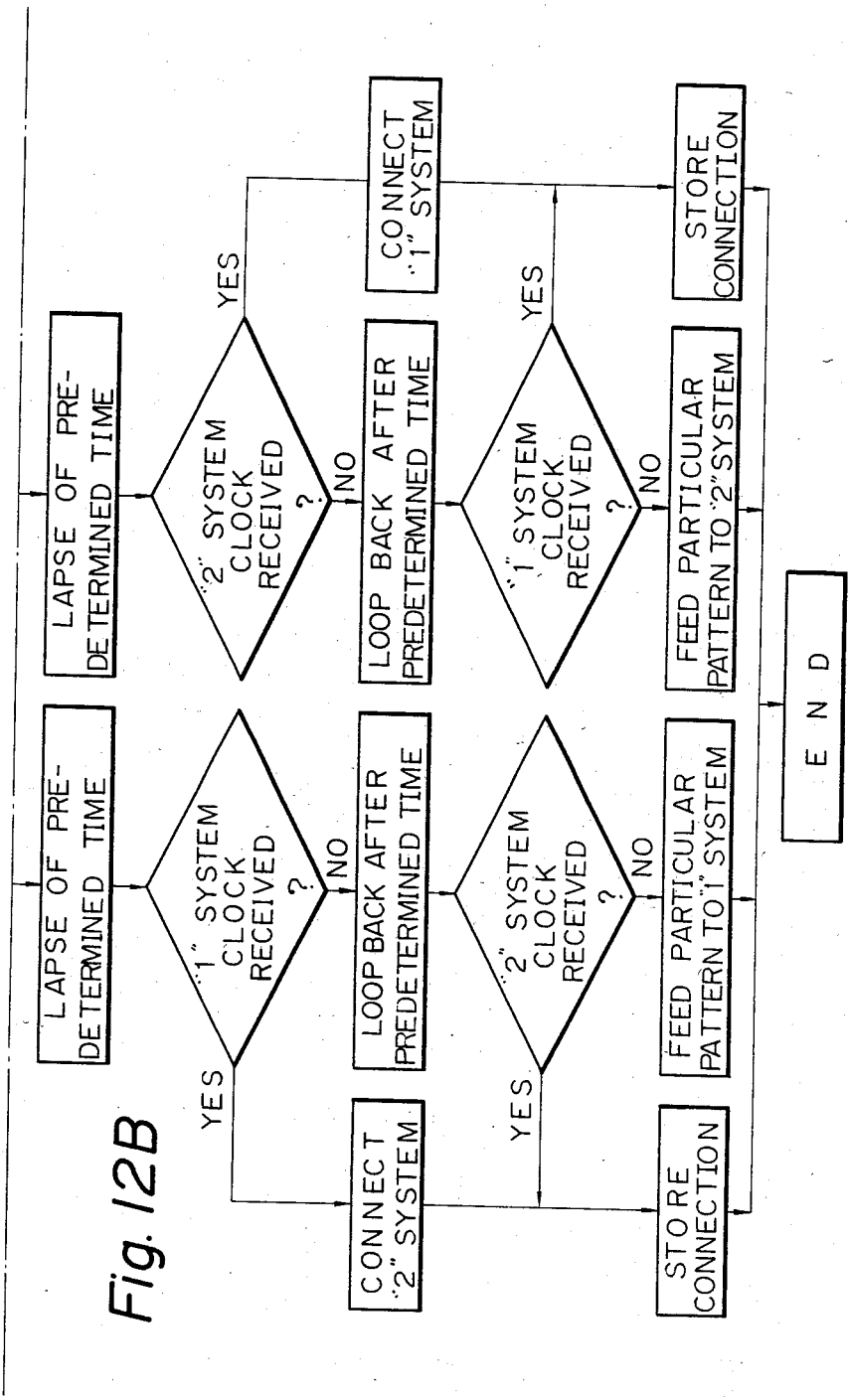
FIG. 12 illustrates the combination of FIG. 12A and FIG. 12B into a flowchart demonstrating the operation of a second embodiment of the present invention FIG. 12A showing the initial activity upon detection of a failure and FIG. 12B showing the concluding activity as the corrective action takes place.

The operation of each transmission device described above will be better understood from the flowchart shown in FIG. 12. It will be apparent that the embodiment described also covers loop switching, loop back, and failure detection resulting from generation of a pattern due to detection of a failure in a photoelectric transducer as well as generation of a particular pattern due to a failure, whether intentional or not, in a transmission device connected to the upstream side of a transmission path.

To summarize the second embodiment described hereinabove, in response to signal down or a particular pattern, a particular pattern different from the case of signal down is sent out to an active loop to switch both the input and output to the back up loop; in the case of signal down, detection thereof is stored. Thus, the whole system can automatically reconstruct a new loop while a failure portion can be automatically located.

Figure 13:
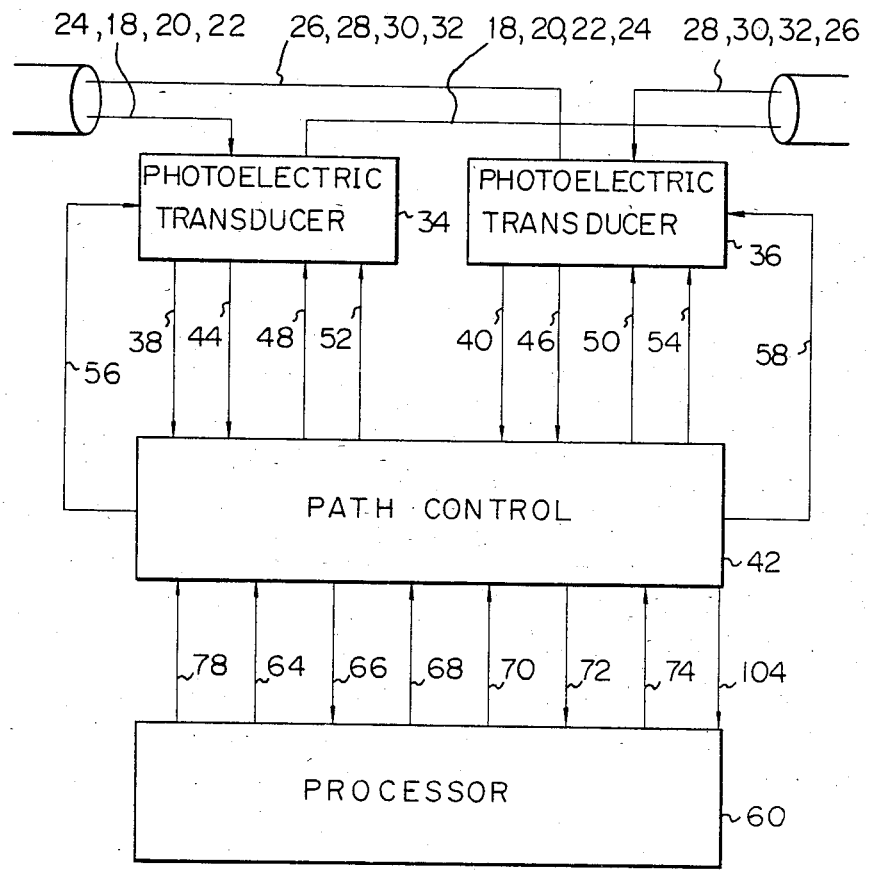
FIG. 13 is a block diagram of a third embodiment of the present invention.

Referring to FIG. 13, a third embodiment of the present invention is shown. The transmission device of FIG. 13 is common in construction to that of FIG. 2, concerning the structural elements 34–66 except for the absence of the storage and its associated lines. The transmission control 46 is controlled by a group of control lines 68. Data is fed to the loop over a data line 70, while data from a loop is fed to the processor by a group of data lines 72. The write pulse line 74 feeds out a write pulse as earlier mentioned. As also earlier described, the transmission request line 78 conveys a transmission request signal which becomes turned on when it is desired to deliver data from the data line 70 to a loop.

Figure 14:
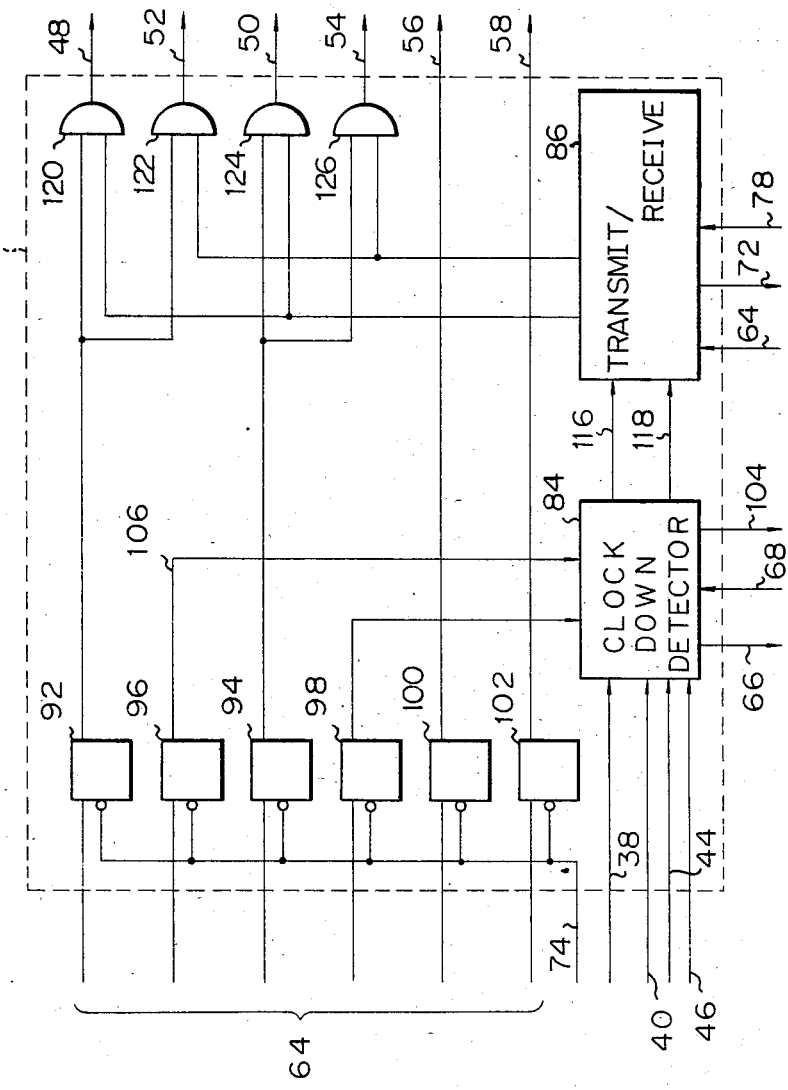
FIG. 14 is a diagram showing an example of a path control circuit included in the circuitry of FIG. 13.

An example of the path control 46 included in the construction of FIG. 13 is shown in FIG. 14. Again, the path control 42 includes the clock down detector circuit 84, transmit/receive circuit 86 for controlling data supply to and from the loop, flip-flop 92 for showing that transmission to the first loop is enabled, flip-flop 94 for showing that transmission to the second loop is enabled, flip-flop 96 for showing that receipt from the first loop is enabled, flip-flop 98 for showing that receipt from the second loop is enabled, flip-flop 100 for delivering a bypass command to the first loop, and flip-flop 102 for delivering a bypass command to the second loop. The line 104 delivers a clock detection signal indicative of the detection of a signal which does not become down. The output line 106 extends from the flip-flop 96, and the output line 108 from the flip-flop 98. Also included in the circuitry are the AND gates 120, 122, 124 and 126.

Figure 15:
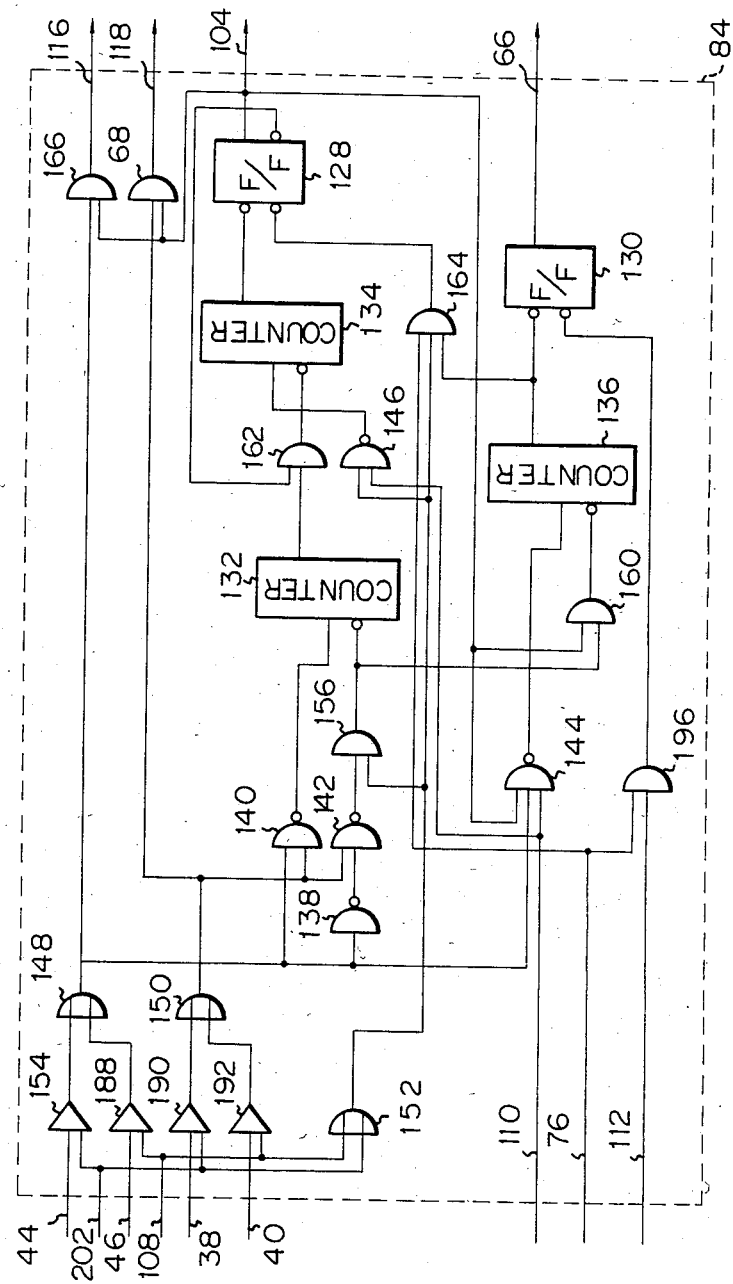
FIG. 15 is a diagram of an example of a clock down detector circuit also included in the construction of FIG. 13.

The clock down detector 84 of FIG. 14 is constructed in the manner shown in FIG. 15. In the drawing, a flip-flop 128 is adapted to show that the loop is in connection with the transmission device, while a flip-flop 130 is adapted to show that the clock signal is down indicating a transition from connection to disconnection. A counter 132 determines whether or not logical ONEs appear in succession in input data from the loop before a predetermined value $T_0$ is reached. A counter 134 continues to operate until a constant $T_1$ is reached, unless the counter 132 detects the constant $T_0$ while a receipt enable flip-flop 96 or 98 is being turned on. A counter 136 keeps on operating up to a predetermined value $T_2$ unless detecting a ZERO in input data from the loop while the flip-flop 128 is being turned on. A clock line 110 supplies an internal clock and a reset line 76 supplies a master reset signal. A line 112 supplies a reset signal for resetting the clock down flip-flop 130 which is output from a higher stage device. Also included in the clock down detector 84 are NAND gates 138, 140, 142, 144 and 146, OR gates 148, 150 and 152, and receivers 154, 188, 190 and 192.

The operation of the third embodiment of the present invention will be described in detail hereinafter. Assume that the first loop made up of the paths 18, 20, 22 and 24 is active. Then, in the transmission device 10, there are set the transmission enable flip-flop 92, receipt enable flip-flop 96, and by-pass flip-flop 102. The signal on the output line 104 from the clock down detector 84 has been turned on. The other transmission devices 12, 14 and 16 are in the same condition as the device 10 and individually connected to the first loop. In FIG. 14, when failure occurs in the path 24 in the above situation, the photoelectric transducer 34 of the device 10 associated with the first loop makes the data line 44 all-ONE. Referring to FIG. 14, in response to the signal thus appearing on the data line 44, the clock down detector 84 delivers an interrupt signal over the line 66 to the processor 60. In FIG. 13, the processor 60 responds to the interrupt signal by detecting the occurrence of an interruption and supplying the path control 46 with data via the data line 64 and write pulse via the write pulse line 74. In FIG. 14, the flip-flops 92 and 96 in the circuit 46 are turned off by the data and write pulse so that the delivery of the clock to the first loop is restrained with the flip-flops 94 and 98 turned on. On the expiration of a predetermined time, the flip-flop 100 is set by the data and write pulse from the processor 60 thereby setting up a bypass condition in the first loop. This connects the transmission device 10 to the second loop.

Meanwhile, when the flip-flop 92 is turned off, it turns off the clock and data in the first loop via the AND gate 120. As a result, the path 18 in the first loop is brought into a disconnected state as is the path 24 in the first loop. The device 12 operates in the same manner as the device 10 and thereby brings itself into connection with the second loop. Likewise, the devices 14 and 16 are sequentially connected to the second loop. All the devices become connected to the second loop in the manner described, in response to a failure in the path 24 of the first loop. When a failure occurs in a certain portion of the second loop with which the devices are connected, all the devices will be switched to the first loop instead of the second. Further, a situation wherein the photoelectric transducer 34 or 36 has failed to stop emitting light is also treated as a clock down condition and coped with by the procedure described above.

In the above description, the "bypass" implies a condition that, considering the photoelectric transducer 34 for example, an input to the transducer 34 outgoes the same in a loop fashion neglecting the transmission clock line 48 and data line 52, when the signal on the bypass line 56 is turned on. In this particular embodiment, both the receipt clock line 38 and data line 42 are effective in the bypass condition as well.

The operation of the clock down detector 84 mentioned above will be described in detail. When the receipt enable flip-flop 96 in FIG. 14 is set, the signal line 106 is turned on so that the data and clock from the photoelectric transducer 34 come in through the receiver 154 to activate the counter 132. The counter 132 is continuously incremented if the data from the transducer 34 is a ONE, reset if it is a ZERO, and caused to generate a pulse when the counter 132 reaches the value $T_0$.

The counter 134, starting its operation if the receipt enable line 202 has been turned on, becomes reset when the counter 132 reaches the value $T_0$ or when the flip-flop 128 is set. The counter 134 generates a pulse when incremented to $T_1$, thereby setting the flip-flop 128. Therefore, the high level of the clock detection line 104, which is the output of the flip-flop 128, notifies the processor 60 of the connection condition of the loop. As the flip-flop 128 is set and a ONE appears as the input data due to the internal clock, the counter 136 counts it up. The counter 136 is reset in response to a ZERO in the input data. The counter 136 soon reaches the value $T_2$ to set the clock down flip-flop 130. This turns on the interrupt signal line 66, which is the output of the flip-flop 130, so that the processor 60 is notified of the occurrence of a clock down.

Figure 16:
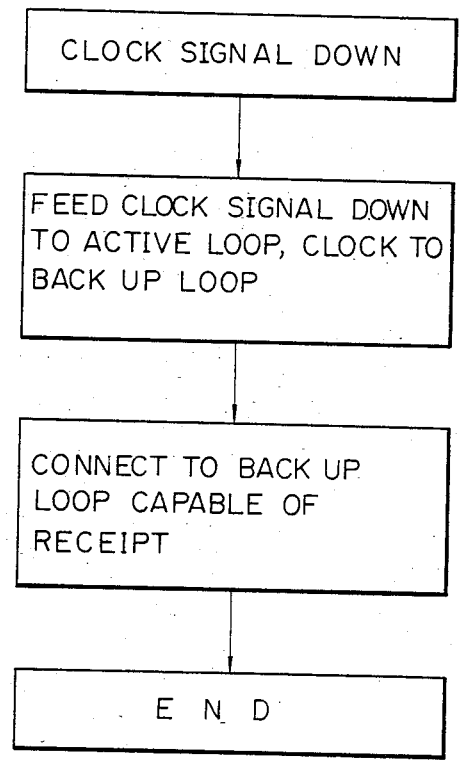
FIG. 16 is a flowchart representing the operation of the third embodiment of the present invention.

FIG. 16 is a flowchart demonstrating the operation of each of the transmission devices described above. It will be seen that once any one of the devices detects clock down, all the devices connected in a loop become switched from one loop to the other.

As will now be apparent, the third embodiment of the present invention described above allows all the transmission devices to automatically switch from an active loop to a back-up loop as soon as a failure occurs in the active loop. This is achieved by identifying signal down at the input side of the active loop and applying signal down to the output side.

Hereinafter, a fourth embodiment of the present invention will be described which is common in construction to the embodiment of FIG. 13 but features a unique manner of operation. In the condition shown in FIG. 13, assume that both the path 24 in the first loop and the path 26 in the second loop have failed at the same time. Then, the photoelectric transducer 34 of the device 10 associated with the first loop make the data line 42 all-ONE. In response to a signal coming in through the data line 42, the clock down detector 84 delivers an interrupt signal to the processor 60 over the line 66. The processor 60 in turn delivers data via the data line 64 and write pulse via the write pulse signal line 74. The data and write pulse turn off the transmission enable flip-flop 92 and receipt enable flip-flop 96 associated with the first loop, thereby preventing the flow of the clock and data to the first loop (clock down). Simultaneously, the processor 60 turns on the transmission enable flip-flop 94 associated with the second loop and turns off bypass flip-flop 102.

In the above situation, the transmission request line 78 is turned off so that the transmit/receive circuit 86 is capable of continuously supplying the transmission path with a pattern which does not cause a clock down. As a predetermined time expires, the receipt enable flip-flop 98 associated with the second loop is turned on and the processor 60 checks a signal on the clock detection line 104, which is an output of the clock down detector 84. However, because the present condition of the path 18 is equivalent to a failure, the device 12 operates in the same manner as the device 10 and, therefore, the path 28 is not clock down. The line 104 in the device 10, therefore, has been turned on when the processor 60 checks it. This turns on the bypass flip-flop 100 associated with the first loop. Afterwards, the loop is switched from the first to the second.

In this manner, the clock down propagates sequentially down to the device 16 to connect the devices to the first loop. Concerning the operation of the device 16, due to the breakage of the path 26, the clock detection line 104 has been turned off when checked by the processor 60. This turns off the receipt enable flip-flop 98 associated with the second loop and turns on the receipt enable flip-flop 96 associated with the first loop, the processor then checks the clock detection line 104. At this instant, because the devices 10, 12 and 14 associated with the first loop are in the bypass state, the processor 60 in the device 16, concluding the clock detection line 104 to have been turned off, turns off the transmission enable flip-flop 94 for a predetermined time and, thereafter, turns it on again. That is, the device 16 is brought into the loop back condition wherein the first loop is for receipt and the second loop for transmission, resulting clock down in the path 32 for a given period of time. Then, the processor 60 in the device 14 detects the "on" state of the clock down interrupt line 66 and turns off the flip-flops 94 and 98 associated with the second loop by means of the data on the line 64 and the write pulse on the line 74, thereby preventing the clock and data from entering the second loop.

Next, the processor 60 turns on the transmission enable flip-flop 92 and bypass flip-flop 100 associated with the first loop. At this time, the transmission request line 78 is off so that the transmit/receive circuit 86 continuously sends out to the line a pattern which does not cause clock down. After a predetermined period of time, the processor 60 turns on the receipt enable flip-flop associated with the first loop and then checks the clock detection line 104. Because the condition of the path 30 is equivalent to breakage this time, the device 12 is operating in the same manner as the device 16 and, therefore, the path 24 is not clock down. The clock detection line 104, therefore, is off when checked by the processor 60 of the device 14. The processor 60 thus turns on the bypass flip-flop 102 associated with the second loop thereby switching the loop from the second to the first. The clock down condition propagates sequentially through the second loop down to the device 10 so as to fully replace the second loop by the first.

In the device 10, due to the failure in the path 24, the processor 60 checks the signal on the clock detection signal line 104 to find it turned off. Therefore, the processor 60 turns off the receipt enable flip-flop 96, turns on the receipt enable flip-flop 98, and then checks the clock detection line 104. In this situation, the devices 12 and 14 are connected to the first loop, and bypass the second loop, while the device 16 is in the loop back condition, so that the pattern appearing at the first loop side of the device 10 and which does not cause clock down is continuously circulated through the devices 10, 12, 14 and 16 in this order. This turns on the signal on the clock detection line 104 in the device 10 and the operation is terminated. That is, the device 10 is brought into the loop back condition in which the second loop is for receipt and the first for transmission. The final system condition resulting from the breakage in the paths 24 and 26 is shown in FIG. 5.

Details of the clock down detector 84 will be described. When the receipt enable flip-flop 96 is set, a signal line 202 is turned on to route the data and clock from the photoelectric transducer 34 to the counter 132 via the lines 42 and 38, receivers 154 and 190, and NAND gates 138, 140 and 142. The counter 132 is incremented by ONEs in the data from the photoelectric transducer 34, reset by a ZERO, and caused to generate a pulse when incremented to $T_0$. While the counter 134 starts its operation due to the "on" state of the receipt enable line 202, it becomes reset either when the counter 132 reaches $T_0$ or when the flip-flop 128 is set. The counter 134 generates a pulse when incremented to $T_1$. Further, the flip-flop 128 is reset in response to the counter $T_1$ of the counter 134. Therefore, as soon as the clock detection line 104 connected to the output of the flip-flop 128 is turned on, the processor 60 is notified of the connected condition of the paths. If the input data is a ONE when the flip-flop is set and the internal clock is supplied, the counter 136 counts it up. The counter 136 is reset in response to a ONE in the input data. The clock down flip-flop 130 will soon be set in response to the count $T_2$ of the counter 136. This turns on the interrupt line 66 in response to setting of the clock down flip-flop 130, thereby notifying the processor 60 of the clock down condition.

Figure 17B:
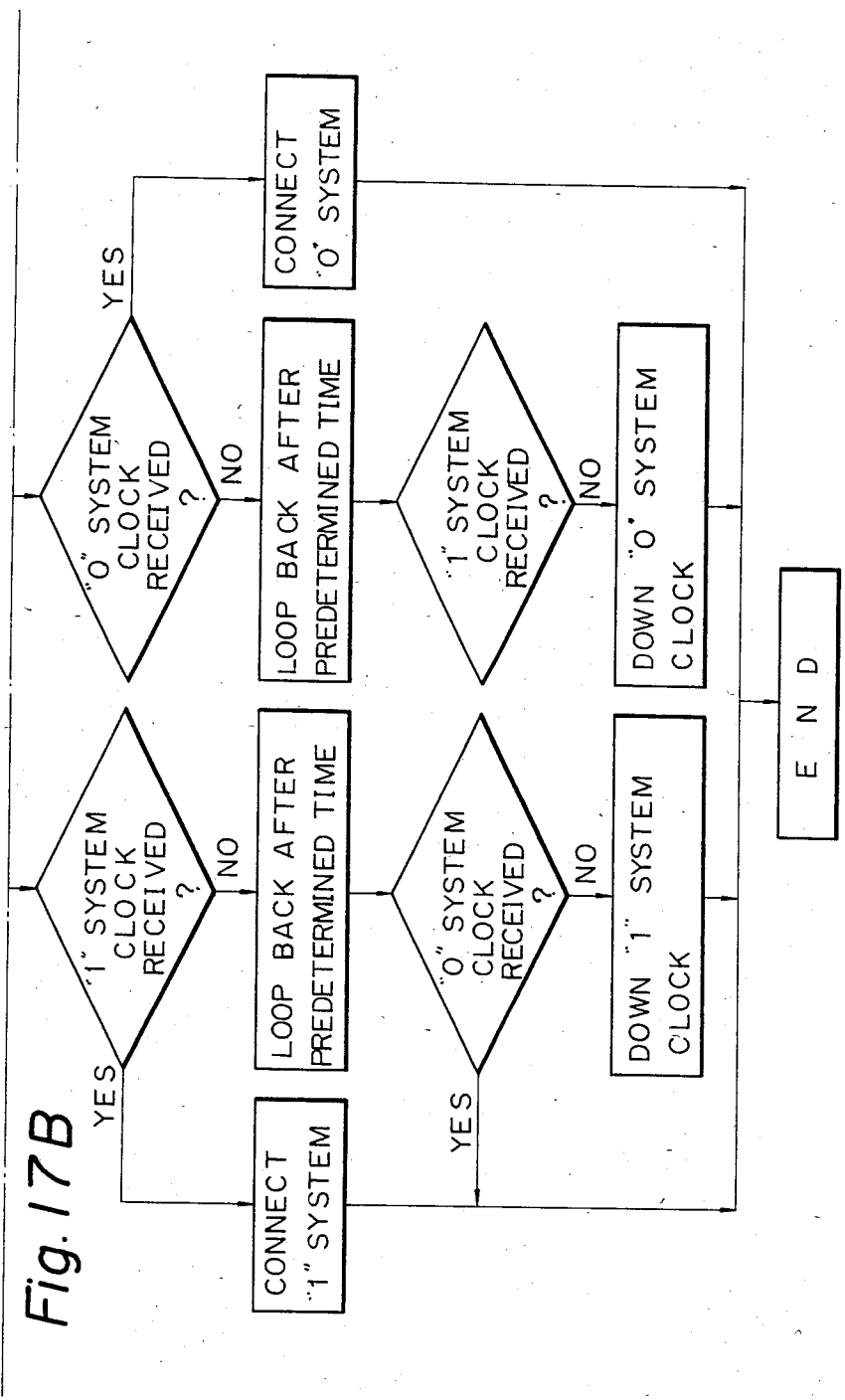
FIG. 17 illustrates the combination of FIGS. 17A and 17B into a flowchart demonstrating the operation of a fourth embodiment of the present invention FIG. 17A showing the initial activity upon detection of a failure and FIG. 17B showing the concluding activity as the corrective action takes place.

Refer to FIG. 9 for the construction which confines the number of successive ONEs to within $T_0$ to provide the pattern which does not cause a clock down. FIG. 17 represents the operation of each transmission device described above.

As discussed hereinabove, the fourth embodiment of the present invention is designed to feed out a signal which makes an active loop signal down but not a back up loop and, on the expiration of a given period of time, sets up a loop back condition in the back up loop if a signal is ineffective. This kind of construction allows the whole system to automatically reconstruct a loop.

Various modifications will become possible for those skilled in the art after receiving the teachings of the present disclosure without departing from the scope thereof.

What is claimed is:

1. In a data transmission system for transmitting signals comprising clock and data signals in a sequential frame format, said system having a pair of transmission loops, one of which is an active loop and the other a back up loop having direction of signal propagation opposite to that of the active loop, and a plurality of data transmission devices, each of which is connected to the two transmission loops, each of said data transmission devices comprising:

detector means for detecting the absence of a clock signal from a received frame which is transmitted over the active loop;

generator means responsive to the detector means for generating a first signal when said detector means has detected the absence of a clock signal in a received frame transmitted on the active loop;

transmitter means for, after said generator means has generated said first signal, transmitting a second signal to a second data transmission device which is connected downstream on said active loop, said second signal indicating a failure in the active loop, and transmitting a third signal to a third transmission device which is connected downstream on said back up loop, said third signal being adapted to test the continuity of said back up loop without indicating a clock absence; and selector means for switching both an input and an output of said device to the back up loop, when the third signal has been detected over the back up loop upon lapse of a predetermined period of time after the transmission of the second signal and the third signal, thereby using the back up loop as the active loop.

2. In the data transmission system as claimed in claim 1, each of the data transmission devices further comprising connecting means for connection of the input of such device to the active loop and the output to the back up loop, when the third signal has not been detected over the back up loop upon lapse of a predetermined period of time after the transmission of the second signal and the third signal, thereby connecting such device in a loop back condition.

3. In the data transmission system as claimed in claim 2, each of the data transmission devices further comprises transmitter means for transmitting the second signal to the output of the device when the particular signal has not been detected at the input after the loop back condition.

4. In the data transmission system as claimed in claim 2, each of the data transmission devices further comprises means for blocking the clock from the output of the device when the signal at the output of the device has not been detected after the loop back condition.

5. In the data transmission system as claimed in claim 1, each of the data transmission devices further comprises store means for, when a clock absence in the active loop has been detected, storing the detecting of the clock absence.

6. In a data transmission system for transmitting signals comprising clock and data in a frame format, said system having a pair of transmission loops, one of which is an active loop and the other a back up loop having a direction of signal propagation opposite to that of the active loop, and a plurality of data transmission devices each of which is connected to the two transmission loops, each of said data transmission devices comprising:

detector means for detecting the absence of a clock from a particualr frame which is transmitted over the active loop;

generator means, responsive to said detector means for generating a first signal when said detector means has detected a clock absence in a received frame transmitted in the active loop;

transmitter means for, after the generator means has generated said first signal, transmitting said first signal to a second data transmission device which is connected downstream on said active loop and transmitting a second signal to a third data transmission device which is connected downstream on said back up loop, said second signal being adapted to test the continuity of said back up loop without indicating a clock absence; and selector means for switching both an input and an output of said device to the back up loop, when the second signal has been detected over the back up loop upon lapse of any predetermined period of time after the transmission of a particular patter and the second signal, thereby using the back up loop as the active loop.

7. In the data transmission system as claimed in claim 6, each of the data transmission devices further comprising connector means for connecting the input of each device to the active loop and the output to the back up loop when the second signal has not been detected over the back up loop upon lapse of a predetermined period of time after the transmission of the particular pattern and the second signal, thereby connecting such device in a loop back condition.

8. In the data transmission system as claimed in claim 7, each of the data transmission devices further comprising transmitter means for transmitting the particular pattern to the output of the device when the second signal has not been detected at the input after the loop back condition.

9. In the data transmission system as claimed in claim 6, each of the data transmission devices further comprising store means for storing a clock absence when the clock absence has been detected in the active loop.

10. In a data transmission system for transmitting signals comprising clock and data in a frame format, said system having a pair of transmission loops, one of which is an active loop and the other a back up loop having a direction of signal propagation opposite to that of the active loop, and a plurality of data transmission devices each of which is connected to the two transmission loops, each of said data transmission devices comprising:

detector means for detecting the absence of signal from a particular frame which is transmitted over the active loop;

generator means for generating the clock absence signal when said detector means has detected a clock signal absence in the active loop;

transmitter means for, after said generator means has generated said clock absence signal, generating said clock signal which is propagated downstream on the active loop and transmitting a particular signal to a subsequent transmission device connected downstream in the back up loop, said particular signal not being identified as a clock absence signal; and selector means for switching both the input and output of the device to the back up loop, when the particular signal has been detected over the back up loop upon a lapse of any predetermined period of time after the transmission of the particular signal, thereby using the back up loop as the active loop.

11. In the data transmission system as claimed in claim 10, each of the data transmission devices further comprises conector means for connecting the input of the device to the active loop and the output to the back up loop, when the particular signal has not been detected over the back up loop upon lapse of any predetermined period of time after the transmission of the particular signal, thereby connecting the device in a loop back condition.

12. In the data transmission system as claimed in claim 11, each of the data transmission devices further comprises means for terminating the clock at the output when the particular signal has not been detected at the input after the loop back condition.

* * * * *